United States Patent
Uchino et al.

(10) Patent No.: US 9,825,806 B2
(45) Date of Patent: Nov. 21, 2017

(54) MOBILE COMMUNICATION METHOD AND MOBILE STATION

(71) Applicant: NTT DOCOMO, INC., Tokyo (JP)

(72) Inventors: Tooru Uchino, Tokyo (JP); Hideaki Takahashi, Tokyo (JP); Akihito Hanaki, Tokyo (JP); Wuri Andarmawanti Hapsari, Tokyo (JP); Kenichiro Aoyagi, Tokyo (JP); Shogo Yabuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/415,790

(22) PCT Filed: Jul. 5, 2013

(86) PCT No.: PCT/JP2013/068470
§ 371 (c)(1),
(2) Date: Jan. 20, 2015

(87) PCT Pub. No.: WO2014/013890
PCT Pub. Date: Jan. 23, 2014

(65) Prior Publication Data
US 2015/0180706 A1    Jun. 25, 2015

(30) Foreign Application Priority Data

Jul. 20, 2012 (JP) .................................. 2012-161676

(51) Int. Cl.
*H04L 12/26* (2006.01)
*H04L 1/00* (2006.01)
(Continued)

(52) U.S. Cl.
CPC .......... *H04L 41/0672* (2013.01); *H04W 28/04* (2013.01); *H04W 36/30* (2013.01);
(Continued)

(58) Field of Classification Search
None
See application file for complete search history.

(56) References Cited

U.S. PATENT DOCUMENTS

2009/0104890 A1*  4/2009  Wang ................... H04W 12/02
                                                          455/410
2009/0149189 A1*  6/2009  Sammour ............... H04L 1/165
                                                          455/450

(Continued)

FOREIGN PATENT DOCUMENTS

EP         2139292 A2     12/2009
JP       2007-336490 A    12/2007

OTHER PUBLICATIONS

Extended European Search Report in counterpart European Patent Application No. 13819712.4, dated Aug. 17, 2015 (9 pages).
MediaTek Inc.; "Impact on handover with PDCP SN Change"; 3GPP TSG RAN WG2 Meeting #79, R2-123592; Qingdao, China; Aug. 13-17, 2012.

(Continued)

*Primary Examiner* — Steven H Nguyen
*Assistant Examiner* — Rebecca Song
(74) *Attorney, Agent, or Firm* — Osha Liang LLP

(57) ABSTRACT

In a state where a mobile station UE is communicating with a radio base station S-eNB supporting "extended PDCP-SN," the mobile terminal continues communications even if it performs a reconnection procedure with a radio base station T-eNB not supporting "extended PDCP-SN." A mobile communication method according to the invention includes the steps of, when detecting RLF in the bearer in the above-described state, the mobile station UE resetting setting of "extended PDCP-SN" and establishing a bearer using "conventional PDCP-SN" by performing a reconnection procedure with a radio base station T-eNB not supporting "extended PDCP-SN."

2 Claims, 10 Drawing Sheets

(51) Int. Cl.
  *H04L 12/24* (2006.01)
  *H04W 28/04* (2009.01)
  *H04W 36/30* (2009.01)
  *H04W 76/02* (2009.01)
  *H04W 28/06* (2009.01)
  *H04W 36/00* (2009.01)

(52) U.S. Cl.
  CPC .......... *H04W 76/028* (2013.01); *H04W 28/06* (2013.01); *H04W 36/0011* (2013.01)

(56) References Cited

U.S. PATENT DOCUMENTS

| | | | | |
|---|---|---|---|---|
| 2009/0175241 | A1* | 7/2009 | Ohta | H04W 36/02 370/331 |
| 2011/0092236 | A1* | 4/2011 | Iwamura | H04L 63/123 455/507 |
| 2013/0148490 | A1* | 6/2013 | Yi | H04B 7/155 370/216 |
| 2015/0146617 | A1* | 5/2015 | Park | H04W 24/10 370/328 |

OTHER PUBLICATIONS

International Search Report for corresponding International Application No. PCT/JP2013/068470, dated Jul. 30, 2013 (1 page).
Ericsson et al.; "Limitation of PDCP SN and FMS-fields;" 3GPP TSG-RAN WG2 #78, Tdoc R2-122651; Prague, Czech Republic; May 21-25, 2012 (6 pages).
Samsung; "Discussion on PDCP SN extension;" 3GPP TSG-RAN WG2 Meeting #79, R2-124088; Qingdao, P.R.C.; Aug. 13-17, 2012 (4 pages).
Ericsson et al.; "Limitation of PDCP SN and FMS-fields;" 3GPP TSG-RAN WG2 #79, Tdoc R2-123875; QingDao, China; Aug. 13-17, 2012 (9 pages).
3GPP TS 36.322 V10.0.0; "3rd Generation Partnership Project; Technical Specification Group Radio Access Network; Evolved Universal Terrestrial Radio Access (E-UTRA); Radio Link Control (RLC) protocol specification (Release 10);" Dec. 2010 (39 pages).
3GPP TS 36.323 V10.1.0; "3rd Generation Partnership Project; Technical Specification Group Radio Access Network;.Evolved Universal Terrestrial Radio Access (E-UTRA); Packet Data Convergence Protocol (PDCP) specification (Release 10);" Mar. 2011 (26 pages).

* cited by examiner

FIG. 13
(a)
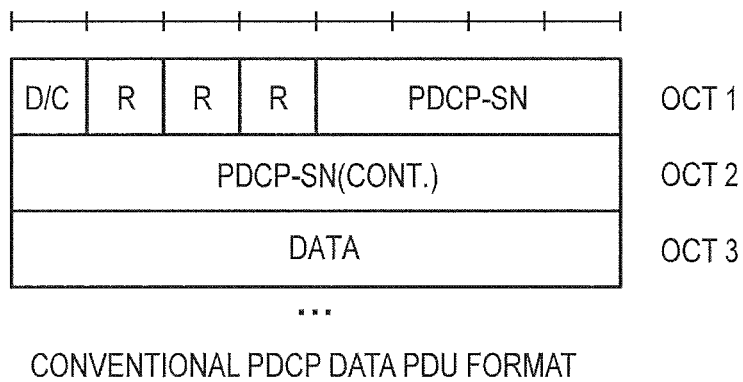
CONVENTIONAL PDCP DATA PDU FORMAT
(b)
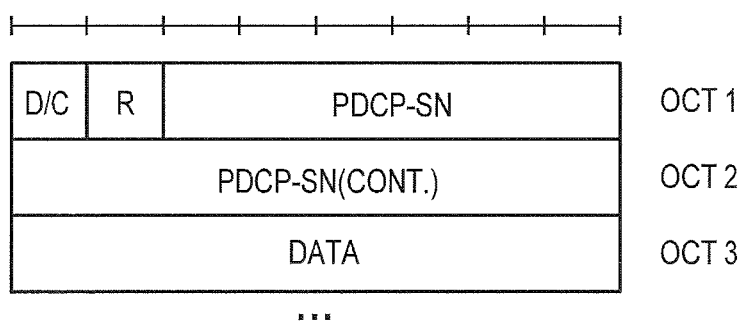
EXTENDED PDCP DATA PDU FORMAT

MOBILE COMMUNICATION METHOD AND MOBILE STATION

TECHNICAL FIELD

The present invention relates to a mobile communication method and a mobile station.

BACKGROUND ART

A radio based station eNB supporting LTE (Long Term Evolution), and a mobile station UE have a PHY (physical) layer, a MAC (Media Access Control) layer, a RLC (Radio Link Control) layer, a PDCP (Packet Data Convergence Protocol) layer, and a RRC (Radio Resource Control) layer as illustrated in FIG. 6.

The PDCP layer is configured to perform ciphering processing, tamper detection processing, and header compression processing.

Here, the ciphering processing and the tamper detection processing use a COUNT value. As illustrated in FIG. 7, a COUNT value includes an HFN (Hyper Frame Number) and a PDCP-SN (Sequence Number).

The PDCP-SN includes 12 bits or 7 bits and is configured to be incremented every time the PDCP layer sends a packet to the RLC.

In addition, the HFN includes 20 bits or 25 bits and is configured to be increment every time the PDCP-SN goes once through all the numbers.

When COUNT values are not synchronized between a PDCP layer on a transmission side and a PDCP layer on a reception side, deciphering processing cannot be correctly performed in the PDCP layer on the reception side.

Specifically, the PDCP layer on the transmission side is configured to perform ciphering processing (header compression processing and tamper detection processing) on a packet (PDCP-SDU) received from a RRC layer by using a COUNT value, and send the RLC layer the resultant received packet as PDCP-PDU with the PDCP-SN added to the header thereof.

On the other hand, the PDCP layer on the reception side is configured to manage a reception window and discard a received packet if the PDCP-SN added to the packet (PDCP-PDU) is PDCP-SN outside the reception window, as illustrated in FIG. 8.

Here, the PDCP layer on the reception side is configured to, if the PDCP-SN added to the received packet (PDCP-PDU) is PDCP-SN inside the reception window, estimate HFN to be used for deciphering the packet from a current reception state, send the packet (PDCP-SDU) deciphered using the estimated HFN to an upper layer, and update the reception window.

As illustrated in FIG. 9 and FIG. 10, when reconnection procedure is completed, the PDCP layer on the transmission side starts transmitting all the packets whose acknowledgements have not been received in the RLC layer.

The PDCP layer on the reception side sends all the packets sendable to the upper layer even in an "out-of-sequence" state, and again tries to perform reception inside the reception window after the reconnection procedure is completed.

Also, after the reconnection procedure is completed, the PDCP layer on the reception side can report a reception status of "PDCP-SN" in "PDCP status report", whereas the PDCP layer on the transmission side can also cancel transmitting of packets reported as received.

As illustrated in FIGS. 11 and 12, however, the following problem may occur. Specifically, a radio base station S-eNB transfers PDCP-SDU whose RLC-ACK is not received to a radio base station T-eNB. If a large amount of PDCP-PDUs are multiplexed on an RLC-PDU, for example, "HFN mismatch" may occur between the radio base station T-eNB and a mobile station UE, so that the reception side fails in the deciphering processing, and cannot extract packets in the normal state.

In particular, if a large amount of PDCP-PDUs are multiplexed on one RLC-PDU, a possibility of occurrence of "HFN mismatch" is high, due to transmission of a large number of PDCP-PDUs for which the RLC-ACK has not been received.

For example, the possibility of occurrence of "HFN mismatch" becomes high when a transmission rate is high, or when a large amount of packets whose size of PDCP-SDU is extremely small are generated.

For this reason, to avoid the occurrence of "HFN mismatch," proposed is to extend a PDCP-SN length, in other words, to adopt "extended PDCP-SN (see, FIG. 13($b$))" which is a sequence number longer than "conventional PDCP-SN (see, FIG. 13($a$))," (Non-patent document 3).

Use of "extended PDCP-SN" makes the PDCP-SN less likely to go once through all the numbers, and thus makes "HFN mismatch" less likely to occur.

Here, a radio base station eNB is configured to instruct the use of "extended PDCP-SN" to a mobile station UE through RRC signaling.

PRIOR ART DOCUMENT

Non-Patent Document

Non-patent document: 3GPP TS36.322
Non-patent document: 3GPP TS36.323
Non-patent document: 3GPP contributed article R2-122651

SUMMARY OF THE INVENTION

However, as illustrated in FIG. 14, when reconnection procedure with a radio base station T-eNB supporting "extended PDCP-SN" is performed on a mobile station UE communicating with a radio base station S-eNB supporting "extended PDCP-SN," there is a problem that communications cannot be continued because the mobile station UE and the radio base station T-eNB use the PDCP-SN with different lengths.

For this reason, the present invention is made with a view to the above-described problem. Accordingly, an objective of the invention is to provide a mobile communication method and a mobile station which enables communications to be continued even when reconnection procedure with a radio base station T-eNB not supporting "extended PDCP-SN" is performed on a mobile station UE communicating with a radio base station S-eNB supporting "extended PDCP-SN."

A first feature of the present invention is summarized as a mobile communication method, including the steps of: when a mobile station detects a radio link failure in a radio link with a first radio base station in a state where a bearer using the extended sequence number as a sequence number in a PDCP layer is established between the mobile station and the first radio base station, causing the mobile station to reset setting of the extended sequence number and a COUNT value; and causing the mobile station to establish a bearer using a regular sequence number which is a sequence number shorter than the extended sequence number by performing a reconnection procedure with a second radio base station not supporting the extended sequence number.

A second feature of the present invention is summarized as a mobile communication method, including the steps of: when a mobile station detects a radio link failure in a radio link with a first radio base station in a state where a bearer using an extended sequence number as a sequence number in a PDCP layer is established between the mobile station and the first radio base station, causing the mobile station to establish a bearer using a regular sequence number which is a sequence number shorter than the extended sequence number by performing a reconnection procedure with a second radio base station not supporting the extended sequence number; and causing the mobile station to reset setting of the extended sequence number and a COUNT value.

A third feature of the present invention is summarized as a mobile station, including: a reconnection procedure unit configured to perform a reconnection procedure. Here, the reconnection procedure unit is configured to, when a radio link failure is detected in a radio link with a first radio base station in a state where a bearer using an extended sequence number as a sequence number in a PDCP layer is established with the first radio base station, reset setting of the extended sequence number and a COUNT value, and thereafter establish a bearer using a regular sequence number which is a sequence number shorter than the extended sequence number by performing a reconnection procedure with a second radio base station not supporting the extended sequence number.

A fourth feature of the present invention is summarized as a mobile station, including: a reconnection procedure unit configured to perform a reconnection procedure. Here, the reconnection procedure unit is configured to, when a radio link failure is detected in a radio link with a first radio base station in a state where a bearer using an extended sequence number as a sequence number in a PDCP layer is established with the first radio base station, establish a bearer using a regular sequence number which is a sequence number shorter than the extended sequence number by performing a reconnection procedure with a second radio base station not supporting the extended sequence number, and reset setting of the extended sequence number and a COUNT value.

BRIEF DESCRIPTION OF THE DRAWINGS

FIG. 13 is a diagram for illustrating the conventional mobile communication system.

MODE FOR CARRYING OUT THE INVENTION (Mobile Communication System according to First Embodiment of the Invention)

Referring to FIGS. 1 to 4, a mobile communication system according to a first embodiment of the invention is described.

In the embodiment, an LTE mobile communication system is described as an example, but the invention is not limited to such a mobile communication system but can be applied to a mobile communication system in any other scheme.

Figure 1:
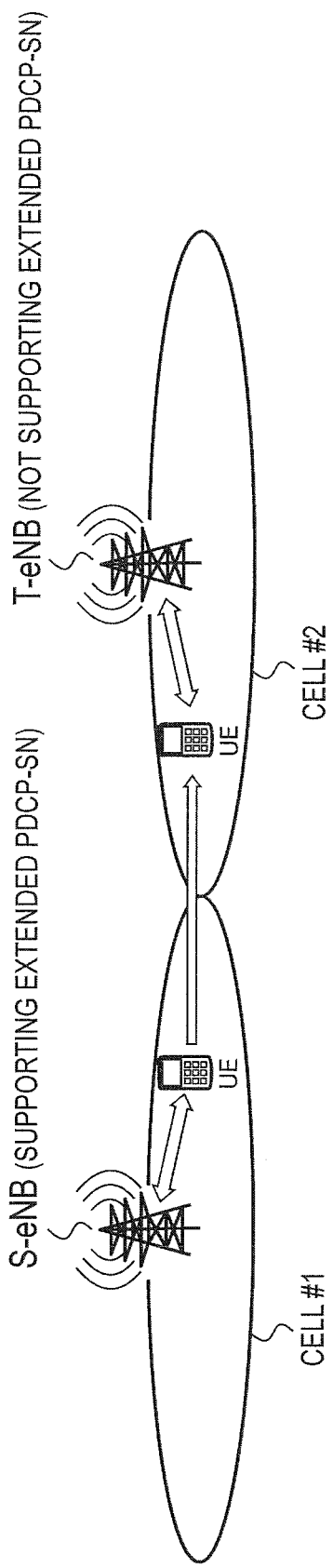
FIG. 1 is an overall configuration diagram of a mobile communication system according to a first embodiment of the invention.

As illustrated in FIG. 1, a mobile communication system according to the embodiment includes a radio base station S-eNB supporting "extended PDCP-SN" and a radio base station T-eNB not supporting "extended PDCP-SN," in other words, supporting only "conventional PDCP-SN."

Figure 2:
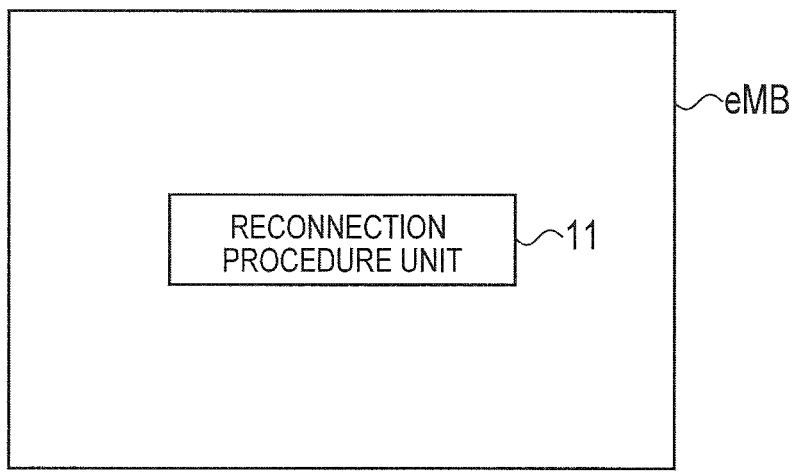
FIG. 2 is a functional block diagram of a radio base station according to the first embodiment of the invention.

As illustrated in FIG. 2, a radio base station eNB according to the embodiment includes a reconnection procedure unit 11. The reconnection procedure unit 11 is configured to perform processing for a reconnection procedure of a mobile station UE.

Figure 3:
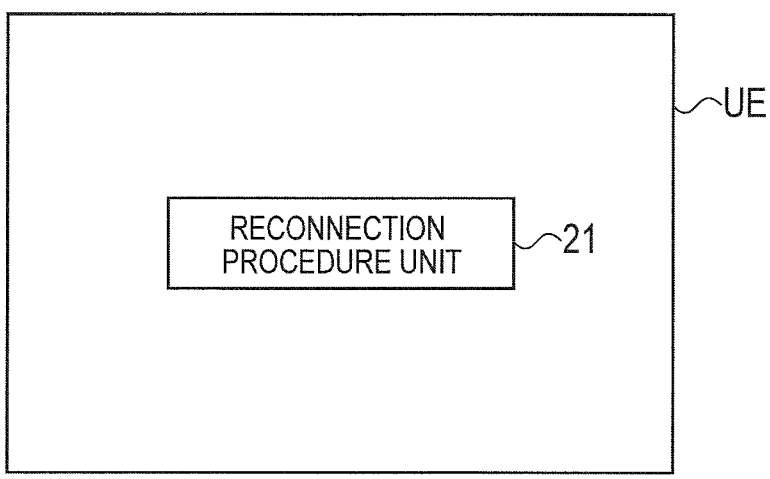
FIG. 3 is a functional block diagram of a mobile station according to the first embodiment of the invention.

As illustrated in FIG. 3, a mobile station UE according to the embodiment includes a reconnection procedure unit 21. The reconnection procedure unit 21 is configured to perform processing for a reconnection procedure of a mobile station UE.

When RLF (Radio Link Failure) is detected in a radio link with a radio base station S-eNB in a state where a bearer using "extended PDCP-SN" is established with the radio base station S-eNB, the reconnection procedure unit 21 resets the setting of "extended PDCP-SN" (and a COUNT value), and then performs a reconnection procedure with a radio base station T-eNB not supporting "extended PDCP-SN" to establish a bearer using "conventional PDCP-SN."

Hereinafter, referring to FIG. 4, an operation of a mobile communication system according to the embodiment is described.

Figure 4:
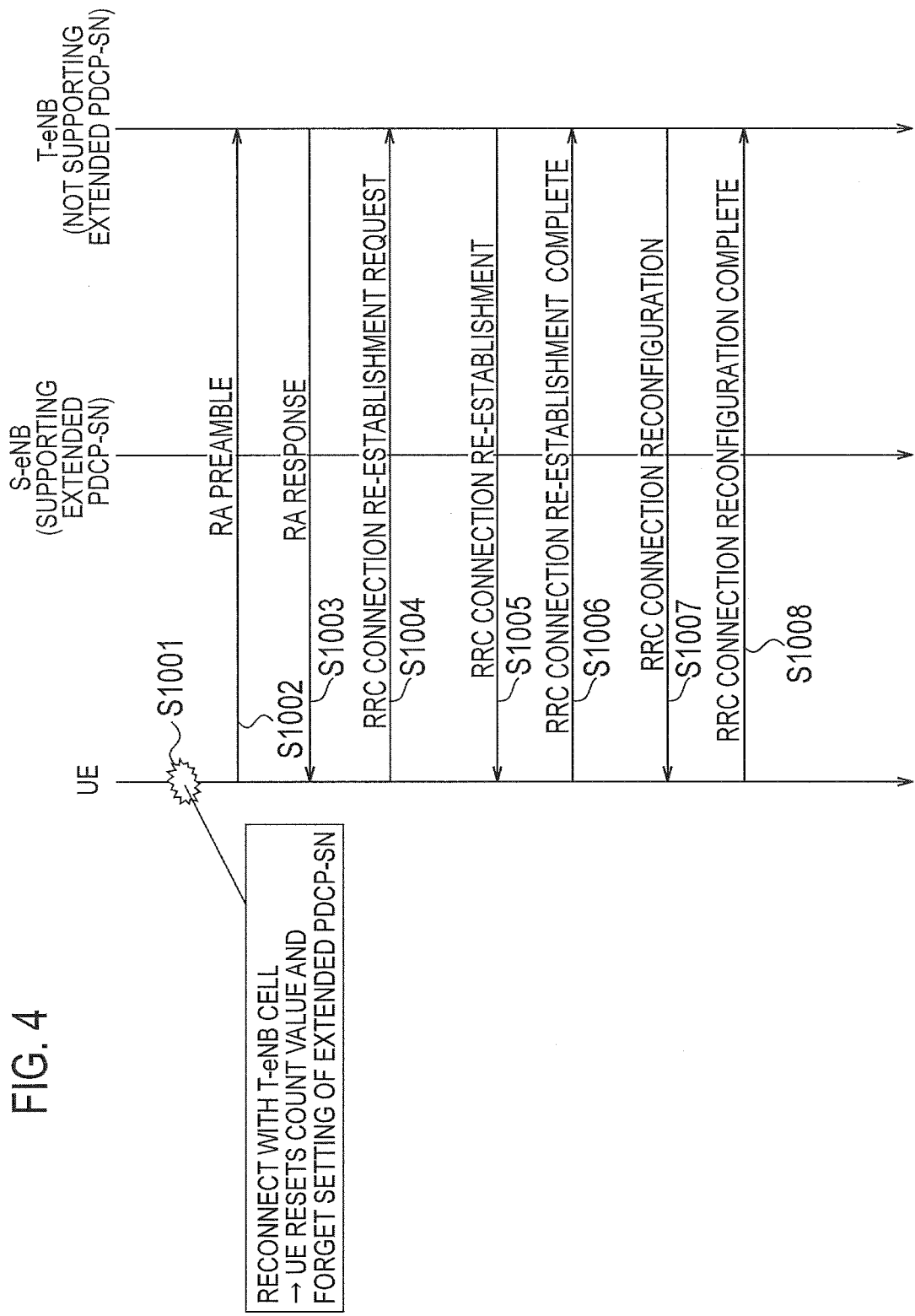
FIG. 4 is a sequence diagram showing an operation of a mobile communication system according to the first embodiment.

As illustrated in FIG. 4, at step S1001, when the mobile station UE detects RLF in a radio link with a radio base station S-eNB in a state where a bearer using "extended PDCP-SN" is established with the radio base station S-eNB, the mobile station UE determines to perform a reconnection procedure with a radio base station T-eNB.

Here, the mobile station UE resets the COUNT value and also resets the setting of "extended PDCP-SN."

At step S1002, the mobile station UE transmits "RA preamble" to the radio base station T-eNB. At step S1003, the radio base station T-eNB transmits "RA response" to the mobile station UE.

At step S1004, the mobile station UE transmits "RRC connection re-establishment request" to the radio base station T-eNB. At step S1005, the radio base station T-eNB transmits "RRC connection re-establishment" to the mobile station UE.

At step S1006, the mobile station UE transmits "RRC connection re-establishment complete" to the radio base station T-eNB. At step S1007, the radio base station T-eNB transmits "RRC connection reconfiguration" to the mobile station UE. At step S1008, the mobile station UE transmits "RRC connection reconfiguration complete" to the radio base station T-eNB.

In the mobile communication system according to the embodiment, when determining to perform the reconnection procedure with the radio base station T-eNB, the mobile station UE can establish a bearer using "conventional PDCP-SN" with the radio base station T-eNB while forgetting the setting of "extended PDCP-SN" and thereby can continue the communications.

(Modification 1)

Figure 5:
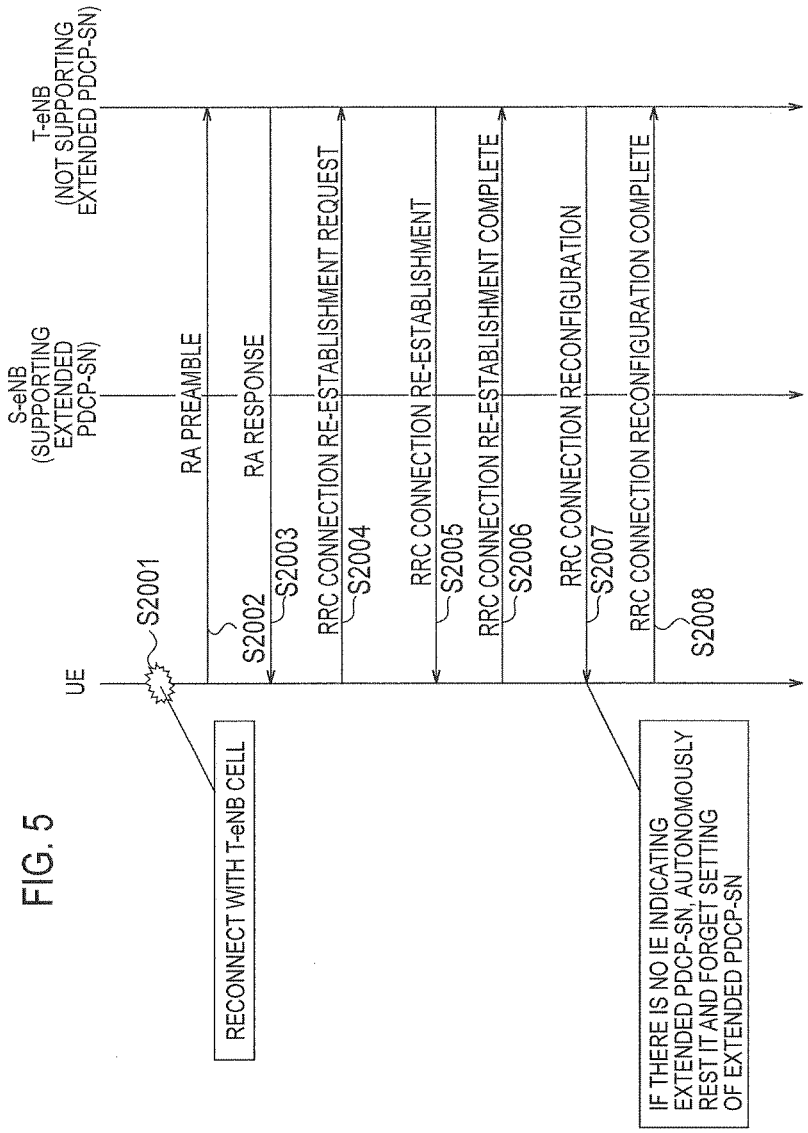
FIG. 5 is a sequence diagram showing an operation of the mobile communication system according to Modification 1 of the invention.
Figure 6:
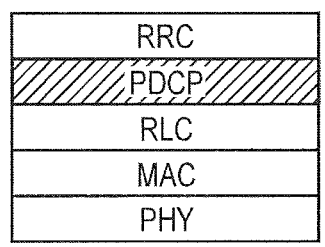
FIG. 6 is a diagram for illustrating a conventional mobile communication system.
Figure 7:
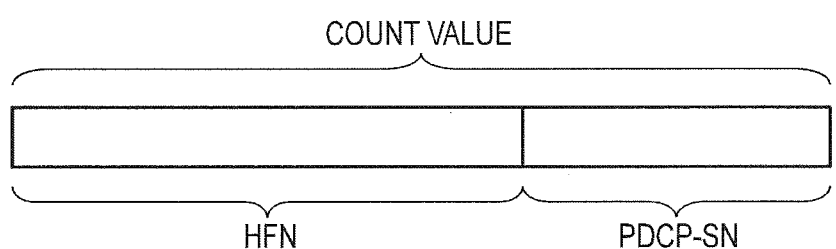
FIG. 7 is a diagram for illustrating the conventional mobile communication system.
Figure 8:
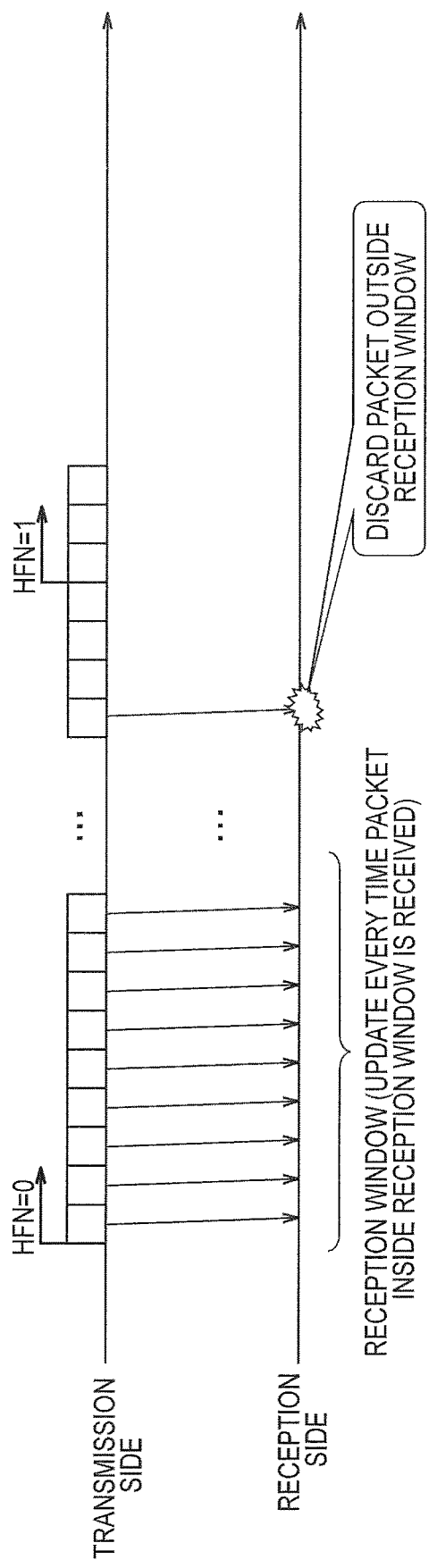
FIG. 8 is a diagram for illustrating the conventional mobile communication system.
Figure 9:
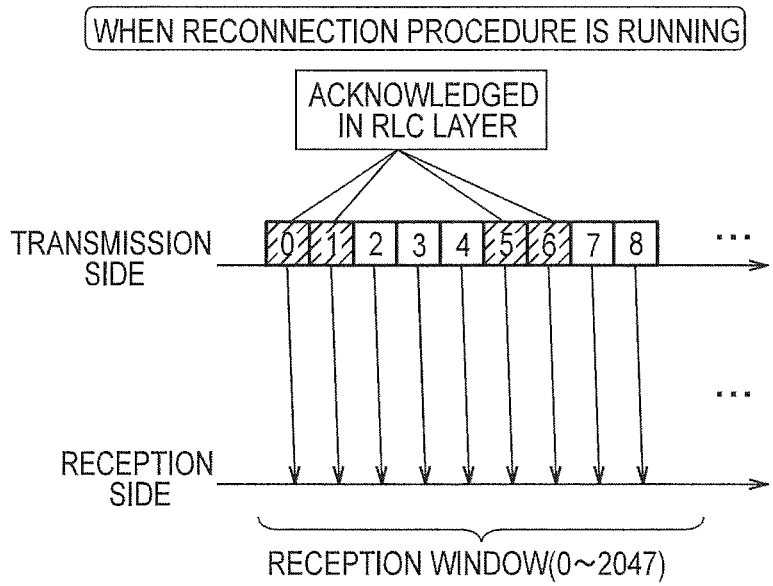
FIG. 9 is a diagram for illustrating the conventional mobile communication system.
Figure 10:
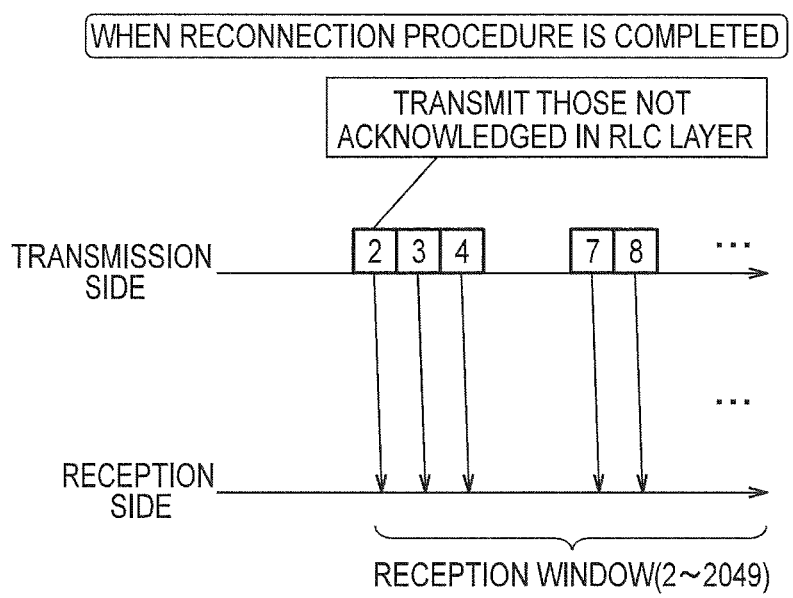
FIG. 10 is a diagram for illustrating the conventional mobile communication system.
Figure 11:
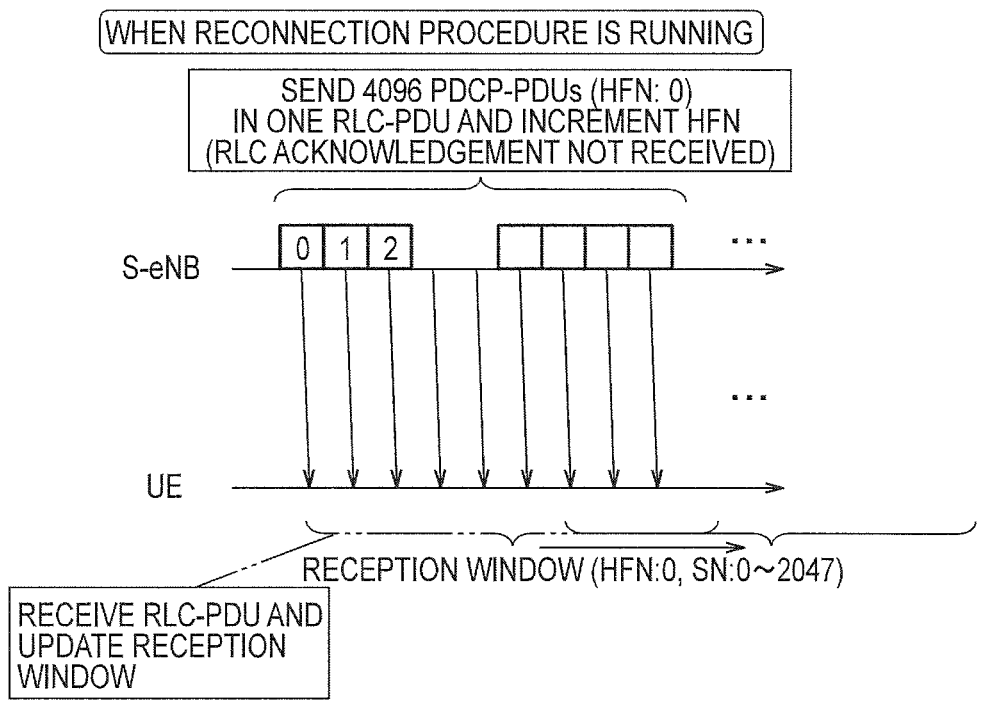
FIG. 11 is a diagram for illustrating the conventional mobile communication system.
Figure 12:
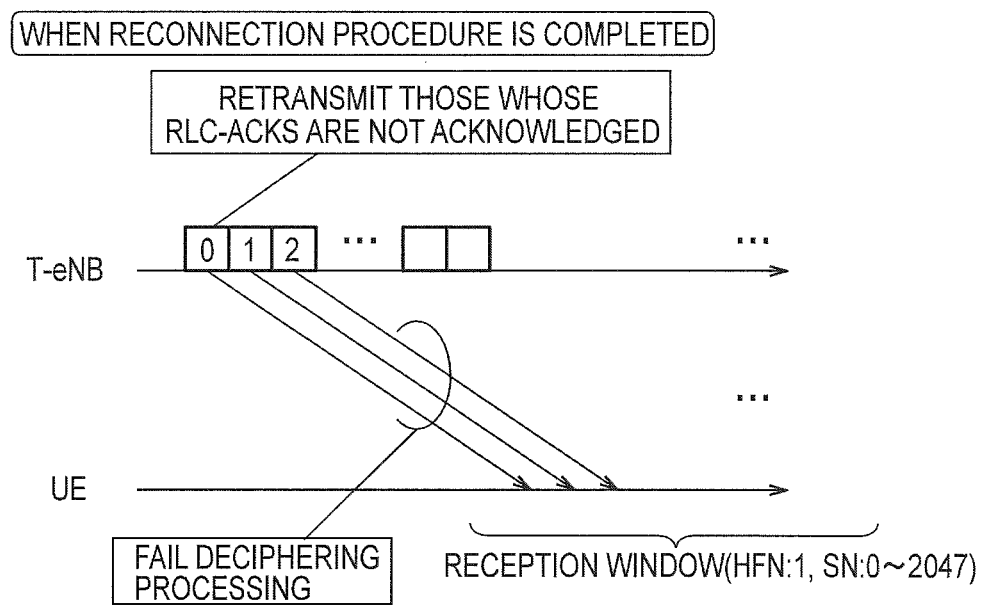
FIG. 12 is a diagram for illustrating the conventional mobile communication system.
Figure 14:
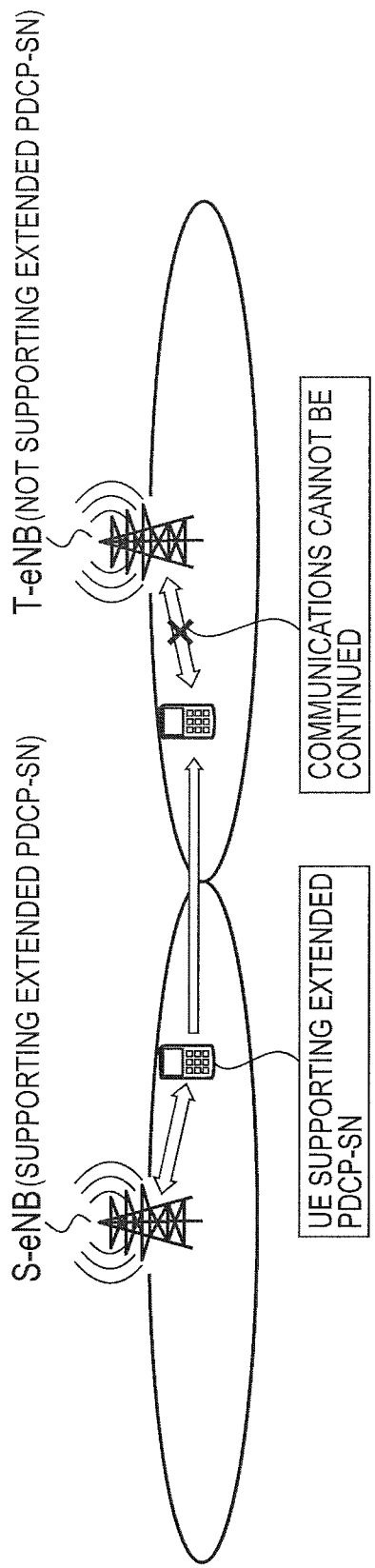
FIG. 14 is a diagram for illustrating the conventional mobile communication system.

Referring to FIG. 5, a mobile communication system according to Modification 1 of the invention is described by paying attention to a difference from the mobile communication system according to the above-described first embodiment.

In the mobile communication system according to Modification 1, a reconnection procedure unit 21 is configured to, when RLF is detected in a radio link with a radio base station S-eNB in a state where a bearer using "extended PDCP-SN" is established with the radio base station S-eNB, establish a bearer using "conventional PDCP-SN" by performing a reconnection procedure with a radio base station T-eNB not supporting "extended PDCP-SN" and reset the setting of "extended PDCP-SN" and a COUNT value.

Hereinafter, referring to FIG. 5, an operation of the mobile communication system according to Modification 1 is described.

As illustrated in FIG. 5, at step S2001, when detecting RLF in a radio link with a radio base station S-eNB in a state where a bearer using "extended PDCP-SN" is established with the radio base station S-eNB, the mobile station UE determines to perform a reconnection procedure with a radio base station T-eNB.

At step S2002, the mobile station UE transmits "RA preamble" to the radio base station T-eNB. At step S2003, the radio base station T-eNB transmits "RA response" to the mobile station UE.

At step S2004, the mobile station UE transmits "RRC connection re-establishment request" to the radio base station T-eNB. At step S2005, the radio base station T-eNB transmits "RRC connection re-establishment" to the mobile station UE.

At step S2006, the mobile station UE transmits "RRC connection re-establishment complete" to the radio base station T-eNB. At step S2007, the radio base station T-eNB transmits "RRC connection reconfiguration" to the mobile station UE.

Here, if an information element which instructs use of "extended PDCP-SN" is not included in "RRC connection reconfiguration," the mobile station UE resets the COUNT value and also resets the setting of "extended PDCP-SN."

At step S2008, the mobile station UE transmits "RRC connection reconfiguration complete" to the radio base station T-eNB.

In the mobile communication system according to Modification 1, when determining to perform the reconnection procedure with the radio base station T-eNB, the mobile station UE can establish a bearer using "conventional PDCP-SN" with the radio base station T-eNB while forgetting the setting of "extended PDCP-SN" based on the content of "RRC connection reconfiguration" received during the reconnection procedure and thereby can continue the communications.

The features of the above-described embodiment may also be expressed as follows.

A first feature of this embodiment is summarized as a mobile communication method, including the steps of: when a mobile station UE detects RLF (radio link failure) in a radio link with a radio base station S-eNB (first radio base station) in a state where a bearer using "extended PDCP-SN (extended sequence number)" as a sequence number in a PDCP layer is established between the mobile station UE and the radio base station S-eNB, causing the mobile station UE to reset setting of "extended PDCP-SN" and a COUNT value; and causing the mobile station UE to establish a bearer using "conventional PDCP-SN (regular sequence number)" which is a sequence number shorter than "extended PDCP-SN" by performing a reconnection procedure with a radio base station T-eNB (second radio base station) not supporting "extended PDCP-SN."

A second feature of this embodiment is summarized as a mobile communication method, including the steps of: when a mobile station UE detects RLF in a radio link with a radio base station S-eNB in a state where a bearer using "extended PDCP-SN" is established between the mobile station UE and the radio base station S-eNB, causing the mobile station UE to establish a bearer using "conventional PDCP-SN" by performing a reconnection procedure with a radio base station T-eNB not supporting "extended PDCP-SN"; and causing the mobile station UE to reset setting of the "extended PDCP-SN" and a COUNT value.

A third feature of this embodiment is summarized as a mobile station UE, including: a reconnection procedure unit 21 configured to perform a reconnection procedure. Here, the reconnection procedure unit 21 is configured to, when RLF is detected in a radio link with a radio base station S-eNB in a state where a bearer using "extended PDCP-SN" is established with the radio base station S-eNB, reset setting of the "extended PDCP-SN" and a COUNT value, and thereafter establish a bearer using "conventional PDCP-SN" by performing a reconnection procedure with a radio base station T-eNB not supporting "extended PDCP-SN."

A fourth feature of this embodiment is summarized as a mobile station UE, including: a reconnection procedure unit 21 configured to perform a reconnection procedure. Here, the reconnection procedure unit 21 is configured to, when RLF is detected in a radio link with a radio base station S-eNB in a state where a bearer using "extended PDCP-SN" is established with the radio base station S-eNB, establish a bearer using "conventional PDCP-SN" by performing a reconnection procedure with a radio base station T-eNB not supporting "extended PDCP-SN," and reset setting of "extended PDCP-SN" and a COUNT value.

It is to be noted that the reset of the COUNT value includes reset of a related state variable.

It should be noted that the foregoing operations of the mobile station UE and the radio base station eNB may be implemented by hardware, maybe implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161676 (filed on Jul. 20, 2012) is incorporated by reference in the present specification.

INDUSTRIAL APPLICABILITY

As described above, the invention can provide a mobile communication method and a mobile station which enables communications to be continued even when reconnection procedure with a radio base station T-eNB not supporting "extended PDCP-SN" is performed on a mobile station UE communicating with a radio base station S-eNB supporting "extended PDCP-SN."

EXPLANATION OF THE REFERENCE NUMERALS eNB radio base station
UE mobile station
11, 21 reconnection procedure unit

The invention claimed is:

1. A mobile communication method, comprising the steps of:
when a mobile station detects a radio link failure in a radio link with a first radio base station in a state where a bearer using an extended sequence number as a sequence number in a PDCP layer is established between the mobile station and the first radio base station, causing the mobile station to establish a bearer using a regular sequence number which is a sequence number shorter than the extended sequence number by performing a reconnection procedure with a second radio base station not supporting the extended sequence number; and
causing the mobile station to reset setting of the extended sequence number and a COUNT value simultaneously when information which instructs use of the extended sequence number is not included in RRC connection reconfiguration transmitted from the second radio base station.

2. A mobile station, comprising:
a transmitter/receiver; and
a processor coupled to the transmitter/receiver that performs a reconnection procedure,
wherein, when a radio link failure is detected by the transmitter/receiver in a radio link with a first radio base station in a state where a bearer using an extended sequence number as a sequence number in a PDCP layer is established with the first radio base station, the processor establishes a bearer using a regular sequence number which is a sequence number shorter than the extended sequence number by performing a reconnection procedure with a second radio base station not supporting the extended sequence number, and the processor resets setting of the extended sequence number and a COUNT value simultaneously when information which instructs use of the extended sequence number is not included in RRC connection reconfiguration transmitted from the second radio base station.

* * * * *